(12) United States Patent
Ito

(10) Patent No.: US 12,449,094 B2
(45) Date of Patent: Oct. 21, 2025

(54) IN-VEHICLE LIQUID HYDROGEN TANK AND A METHOD FOR MANUFACTURING THE SAME

(71) Applicant: TOYOTA JIDOSHA KABUSHIKI KAISHA, Aichi-ken (JP)

(72) Inventor: Naoaki Ito, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 243 days.

(21) Appl. No.: 18/344,854

(22) Filed: Jun. 30, 2023

(65) Prior Publication Data

US 2024/0003490 A1    Jan. 4, 2024

(30) Foreign Application Priority Data

Jul. 4, 2022   (JP) ................. 2022-107641

(51) Int. Cl.
   *F17C 1/12*       (2006.01)

(52) U.S. Cl.
   CPC ........ *F17C 1/12* (2013.01); *F17C 2201/0109* (2013.01); *F17C 2203/032* (2013.01); *F17C 2203/0391* (2013.01); *F17C 2203/0624* (2013.01); *F17C 2203/0629* (2013.01); *F17C 2203/0636* (2013.01); *F17C 2203/066* (2013.01); *F17C 2209/22* (2013.01);
   (Continued)

(58) Field of Classification Search
   CPC ................ F17C 1/12; F17C 2201/0109; F17C 2203/032; F17C 2203/0391; F17C 2203/0624; F17C 2203/0629; F17C 2203/0636; F17C 2203/066; F17C 2209/22; F17C 2221/012; F17C 2227/0135; F17C 2227/0178; F17C 2270/0168; F17C 2270/0184; F17C 1/14; F17C 13/00; F17C 13/12; Y02E 60/32; B60K 15/03; B60K 15/073; B60K 2015/03046; B60K 2015/03052; B60K 2015/03059; B23K 31/02
   See application file for complete search history.

(56) References Cited

U.S. PATENT DOCUMENTS 5,685,350 A     11/1997   Chowdhury
2004/0195246 A1*  10/2004   Immel ..................... F17C 13/00
                                                   220/560.12
(Continued)

FOREIGN PATENT DOCUMENTS

CN        106764416 A    *   5/2017
DE     102019125184 A1       3/2021
(Continued)

*Primary Examiner* — Joel M Attey
*Assistant Examiner* — Ibrahim A. Michael Adeniji
(74) *Attorney, Agent, or Firm* — HAUPTMAN HAM, LLP

(57) ABSTRACT

An in-vehicle liquid hydrogen tank includes: an inner tank that stores liquid hydrogen; an outer tank that accommodates the inner tank; and a heat-insulation material that is arranged in a heat-insulation clearance as a clearance between the inner tank and the outer tank and holds the inner tank to be separated from an inner surface of the outer tank. The heat-insulation clearance has: a vacuum area that is not filled with the heat-insulation material; and an area that is filled with the heat-insulation material and thus allows the inner tank to be surface-supported by the heat-insulation material.

14 Claims, 8 Drawing Sheets

(52) U.S. Cl.
CPC ............... *F17C 2221/012* (2013.01); *F17C 2227/0135* (2013.01); *F17C 2227/0178* (2013.01); *F17C 2270/0168* (2013.01); *F17C 2270/0184* (2013.01)

(56) References Cited

U.S. PATENT DOCUMENTS

| | | | | |
|---|---|---|---|---|
| 2005/0145160 | A1* | 7/2005 | Kellermann | F17C 3/08 114/357 |
| 2007/0000259 | A1* | 1/2007 | Brook | F17C 9/02 62/7 |
| 2007/0193282 | A1* | 8/2007 | Grayson | F17C 3/10 62/48.3 |
| 2015/0060466 | A1 | 3/2015 | Lind | |
| 2015/0330575 | A1* | 11/2015 | Epstein | F17C 13/00 62/48.1 |
| 2017/0057653 | A1* | 3/2017 | Park | B64D 37/06 |
| 2017/0254481 | A1* | 9/2017 | Cadogan | F17C 3/04 |
| 2020/0114289 | A1* | 4/2020 | Garner | B01D 35/0273 |
| 2022/0381403 | A1* | 12/2022 | Ehgartner | F17C 3/08 |

FOREIGN PATENT DOCUMENTS

| | | | | |
|---|---|---|---|---|
| DE | 102020007617 A1 | * | 7/2021 | ............... F17C 9/00 |
| JP | S52-090757 U | | 7/1977 | |
| JP | S62-041493 A | | 2/1987 | |
| JP | H09-240781 A | | 9/1997 | |
| JP | 2002-106798 A | | 4/2002 | |
| JP | 2007-218317 A | | 8/2007 | |
| JP | 2018-066426 A | | 4/2018 | |
| JP | 2021-050772 A | | 4/2021 | |
| JP | 2022520267 A | * | 3/2022 | ............... F17C 3/08 |

* cited by examiner

IN-VEHICLE LIQUID HYDROGEN TANK AND A METHOD FOR MANUFACTURING THE SAME

CROSS REFERENCE TO RELATED APPLICATION

This application claims priority to Japanese Patent Application No. 2022-107641 filed on Jul. 4, 2022, which is incorporated herein by reference in its entirety including the specification, claims, drawings, and abstract.

TECHNICAL FIELD

The present specification discloses an in-vehicle liquid hydrogen tank that stores liquid hydrogen, and a method for manufacturing the in-vehicle liquid hydrogen tank.

BACKGROUND

Conventionally, an in-vehicle liquid hydrogen tank that stores hydrogen in a liquid state as is has been known. For example, the following technique is disclosed in PATENT DOCUMENT 1. A metallic inner tank is arranged inside an outer tank that is made of a reinforced fiber material, and liquid hydrogen is stored in this inner tank. In PATENT DOCUMENT 1, a vacuum heat-insulation layer is formed between the outer tank and the inner tank. In addition, a shock-absorbing material is partially arranged between the outer tank and the inner tank, and inside the outer tank, the inner tank is suspended and held by the shock-absorbing material. According to such an in-vehicle liquid hydrogen tank, heat transfer to the inner tank is inhibited by the vacuum heat-insulation layer. Thus, it is possible to keep the inside of the inner tank at low temperature and thus to suppress vaporization of liquid hydrogen.

However, in the configuration disclosed in PATENT DOCUMENT 1, the inner tank is suspended and held by the shock-absorbing material that is partially arranged. In this case, when a strong impact is applied to the in-vehicle liquid hydrogen tank, the shock-absorbing material is possibly damaged or deformed, causing the inner tank to collide with the outer tank. As a result, the inner tank is possibly deteriorated or damaged. In the case where the inner tank is deteriorated or damaged, various problems such as leakage of hydrogen possibly occur.

In view of the above, the present specification discloses an in-vehicle liquid hydrogen tank capable of storing liquid hydrogen further stably, and a method for manufacturing the in-vehicle liquid hydrogen tank.

CITATION LIST

PATENT DOCUMENT 1: JP 2018-066426 A

SUMMARY

An in-vehicle liquid hydrogen tank disclosed in the present specification includes: an inner tank that stores liquid hydrogen; an outer tank that accommodates the inner tank; and a heat-insulation material that is disposed in a heat-insulation clearance as a clearance between the inner tank and the outer tank and holds the inner tank to be separated from an inner surface of the outer tank. The heat-insulation clearance has: a vacuum area that is not filled with the heat-insulation material; and an area that is filled with the heat-insulation material and thus allows the inner tank to be surface-supported by the heat-insulation material.

In the vacuum area, heat is not transferred except by radiation. For this reason, it is possible to keep a heat-insulation property of the inner tank high by providing the vacuum area. Meanwhile, in the case where only the vacuum area is provided, the inner tank possibly collides with the outer tank during a collision of a vehicle. However, as described above, such an area is provided where the heat-insulation clearance is filled with the heat-insulation material, so as to allow the inner tank to be surface-supported by the heat-insulation material. In this way, it is possible to prevent such a collision of the inner tank with the outer tank. In other words, with the above configuration, it is possible to prevent the collision of the inner tank with the outer tank during the collision of the vehicle while maintaining the high heat-insulation property. In this way, it is possible to effectively prevent deformation and damage to the inner tank. Therefore, liquid hydrogen can be stored further stably.

In this case, the heat-insulation material may include superinsulation that is formed by stacking one or more heat shield layers, each of which is made of a metal sheet, and one or more spacer layers, each of which is made of a fiber material, and the heat-insulation clearance may be vacuum-suctioned in a state where the heat-insulation material is arranged therein.

It is possible to further effectively prevent a temperature increase of liquid hydrogen by using the superinsulation.

In addition, the heat-insulation material may be accommodated in a sealed bag, and both the inside of the sealed bag and the heat-insulation clearance may be vacuum-suctioned.

With such a configuration, it is possible to simplify manufacture of the liquid hydrogen tank.

The outer tank may have a rupture disc that is ruptured when an internal pressure of the outer tank becomes equal to or higher than a specified allowable pressure, so as to expose the inside of the outer tank to atmospheric air.

With such a configuration, it is possible to prevent an excess increase in the internal pressure of the outer tank and thus to improve safety of the liquid hydrogen tank.

The inner tank may be shaped to have a flat surface section.

Since the heat-insulation material is arranged in the clearance between the outer tank and the inner tank, an internal pressure of the inner tank is dispersed to the outer tank and the heat-insulation material, and a maximum allowable pressure of the inner tank is thereby improved. In addition, even when the inner tank is deformed, the inner tank does not directly contact the outer tank. Thus, the heat-insulation property is maintained. Therefore, the inner tank can be shaped to have the flat surface section.

A booster pump is further provided to pressurize liquid hydrogen stored in the inner tank and to output pressurized liquid hydrogen to the outside. A bottom portion of the inner tank may be formed with a collector section which is depressed downward and in which a lower end of the booster pump is inserted.

With such a configuration, it is possible to suppress a pressure of stored liquid hydrogen to a low value, and it is also possible to suppress the maximum allowable pressure required for the inner tank to a low value. In this way, it is possible to reduce cost and weight related to the hydrogen tank.

A method for manufacturing an in-vehicle liquid hydrogen tank disclosed in the present specification includes: accommodating a heat-insulation material, which includes a fiber material, in a sealed bag and then vacuum-suctioning the inside of the sealed bag; and arranging, inside an outer tank, an inner tank that stores liquid hydrogen, arranging the sealed bag in a heat-insulation clearance as a clearance between the inner tank and the outer tank, and thereafter vacuum-suctioning the heat-insulation clearance.

The heat-insulation material is compressed by vacuum-suctioning the sealed bag in advance. Thus, the heat-insulation material can easily be arranged in the clearance between the outer tank and the inner tank. In addition, the heat-insulation clearance is vacuum-suctioned after the heat-insulation material is arranged therein. In this case, a differential pressure between the inside and the outside of the sealed bag is reduced, the heat-insulation material expands, and thus the clearance can be filled with the heat-insulation material. In other words, with the above configuration, it is possible to easily manufacture the liquid hydrogen tank that can store liquid hydrogen further stably.

According to the technique disclosed in the present specification, liquid hydrogen can be stored further stably.

BRIEF DESCRIPTION OF DRAWINGS

Embodiment(s) of the present disclosure will be described based on the following figures, wherein.

DESCRIPTION OF EMBODIMENTS

Figure 1:
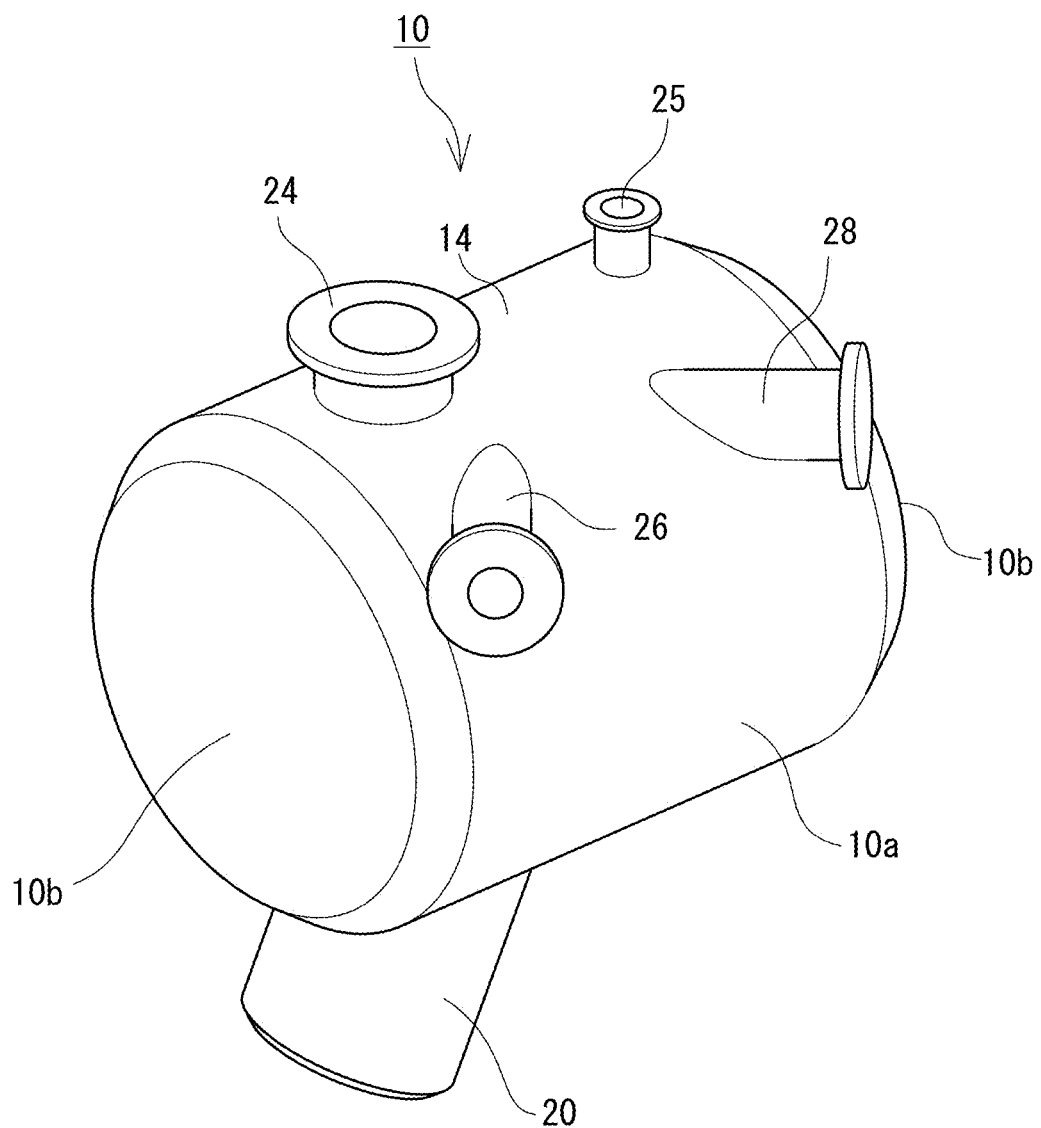
FIG. 1 is a perspective view of an in-vehicle liquid hydrogen tank.
Figure 2:
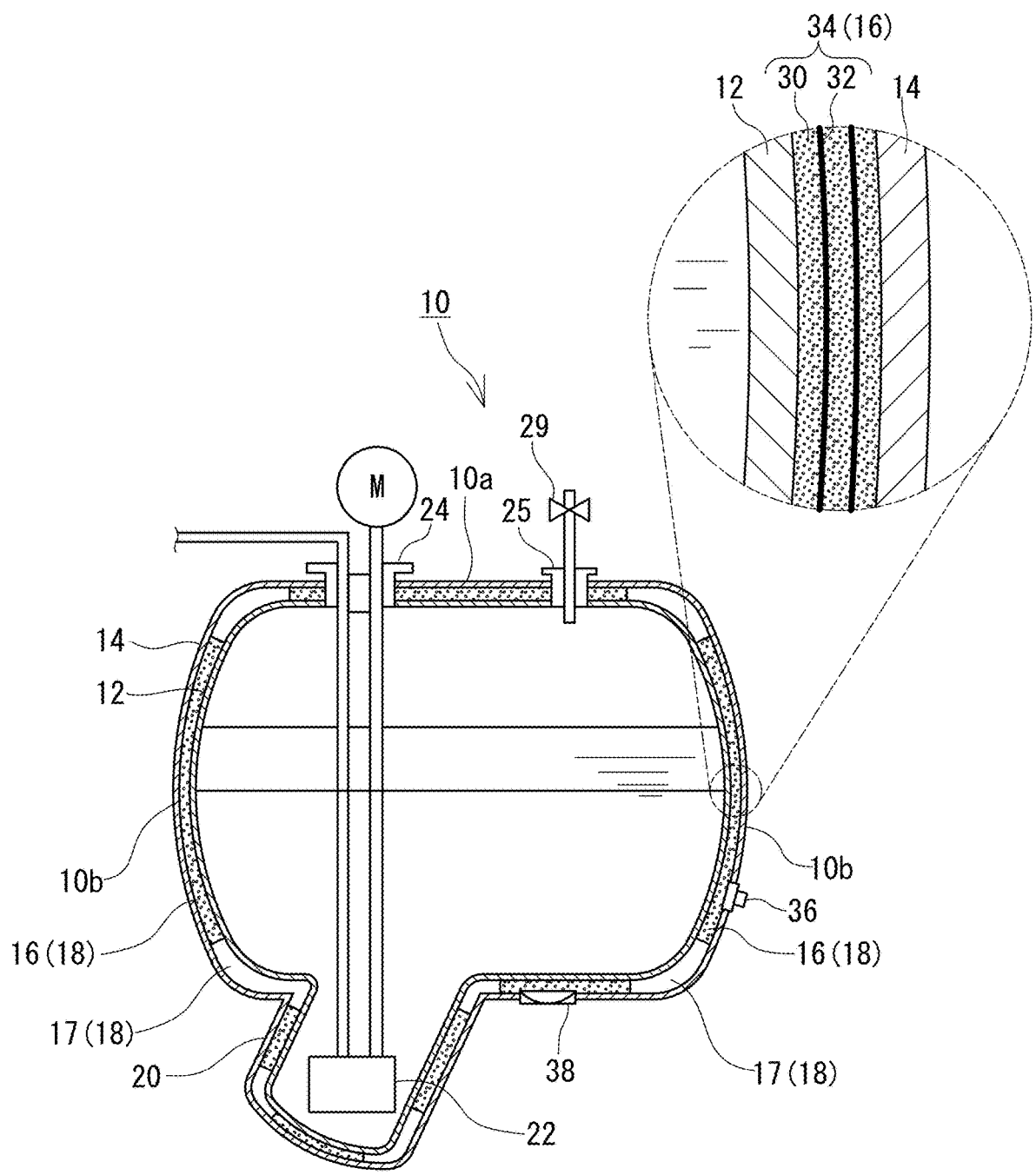
FIG. 2 is a cross-sectional view of the in-vehicle liquid hydrogen tank.

A description will hereinafter be made on a liquid hydrogen tank 10 (hereinafter referred to as a "hydrogen tank 10") with reference to the drawings. FIG. 1 is a perspective view of the hydrogen tank 10. In addition, FIG. 2 is a cross-sectional view of the hydrogen tank 10. This hydrogen tank 10 is mounted to a vehicle and stores hydrogen in a liquid state. No particular limitation is imposed on a type of the vehicle to which such a hydrogen tank is mounted. For example, the hydrogen tank 10 is mounted to a fuel cell electric vehicle or a hydrogen engine vehicle. A description will hereinafter be made on the hydrogen tank being mounted to the hydrogen engine vehicle, as an example. In the hydrogen engine vehicle, a direct-injection hydrogen engine that injects high-pressure hydrogen gas into an engine cylinder is mounted.

The hydrogen tank 10 stores hydrogen in a liquid state. A pressure of stored liquid hydrogen is the same as or slightly higher than the atmospheric pressure, and is equal to or lower than 1 MPa, for example. In addition, the hydrogen tank 10 stores liquid hydrogen in a state of being kept at a sufficiently lower temperature than a boiling point (−252.9° C. at atmospheric pressure).

As illustrated in FIG. 1, the hydrogen tank 10 is in a sandbag shape, and has a cylindrical trunk section 10a and end plate sections 10b, each of which seals an end of the trunk section 10a in an axial direction. The end plate section 10b has a dome shape that is formed by a curved surface. A collector section 20 that is locally depressed is provided to a bottom portion of the hydrogen tank 10. The collector section 20 is formed by a cylinder, and a dome-shaped portion that seals an end portion of the cylinder. As it is apparent from the description so far, almost all constituent surfaces of the hydrogen tank 10 are curved surfaces. With such a configuration, it is possible to bring distribution of a pressure applied to the hydrogen tank 10 close to uniformity.

A liquid hydrogen fill port 26 and a hydrogen gas return port 28 are attached to a lateral portion of the hydrogen tank 10. The liquid hydrogen fill port 26 is a port that accepts a supply of liquid hydrogen, and communicates with an inner tank 12, which will be described below. The hydrogen gas return port 28 is a port used to suction hydrogen gas (so-called boil-off gas), which is vaporized by natural heat input during the supply of liquid hydrogen, to a supply source side. This hydrogen gas return port 28 also communicates with the inner tank 12.

Furthermore, plural ports including a pump port 24 and a boil-off port 25 are provided on top of the hydrogen tank 10. Here, FIG. 1 only illustrates the pump port 24 and the boil-off port 25, and does not illustrate the other ports. The pump port 24 is a port through which a cylinder of a pump 22 (see FIG. 2) is inserted and which communicates with the inner tank 12. The pump 22 is a booster pump that pressurizes and pumps liquid hydrogen stored in the hydrogen tank 10 in response to a request from the hydrogen engine. The pressure of liquid hydrogen after boosting is 5 MPa to several tens of MPa, for example. High-pressure liquid hydrogen that is pumped by the pump 22 is vaporized and is then directly injected as the high-pressure hydrogen gas into the engine cylinder. That is, in this example, only an amount of hydrogen that is required by the hydrogen engine is pressurized and drawn. With such a configuration, it is possible to suppress the pressure of liquid hydrogen stored in the hydrogen tank 10 to a low value. As a result, it is possible to suppress a maximum allowable pressure of the hydrogen tank 10 to a low value and thus to reduce cost and weight related to the hydrogen tank 10.

In the pump 22, a suction port that suctions liquid hydrogen in the tank is disposed in the collector section 20. With such a configuration, even when a remaining amount of liquid hydrogen in the tank becomes small, it is possible to pump liquid hydrogen by the pump 22.

The boil-off port 25 is a port from which the hydrogen gas, which is produced when liquid hydrogen is vaporized by the natural heat input, that is, the boil-off gas, is released to the outside of the tank. This boil-off port 25 communicates with the inner tank 12. A boil-off valve 29 (see FIG. 2) is connected to the boil-off port 25. The boil-off valve 29 is opened when an internal pressure of the hydrogen tank 10 (more precisely, that of the inner tank 12) becomes equal to or higher than a specified release pressure, so as to release the boil-off gas to the outside of the tank.

As illustrated in FIG. 2, such a hydrogen tank 10 has: the inner tank 12 that stores liquid hydrogen; and an outer tank 14 that accommodates the inner tank 12. The inner tank 12 is made of metal that is not brittle at low temperature, and an example of such metal is stainless steel, particularly, 18-8 stainless steel. As described above, this inner tank 12 is in a sandbag shape and has the collector section 20 in the bottom portion. The inner tank 12 is designed that a maximum allowable pressure thereof is approximately twice to five times the above-described release pressure.

The outer tank 14 has such a shape that the inner tank 12 is offset to the outside. Similar to the inner tank 12, such an outer tank 14 is also made of metal that is not brittle at low temperature, and an example of such metal is stainless steel. A heat-insulation clearance 18 that is a clearance with a predetermined thickness is provided between the outer tank 14 and the inner tank 12. The thickness of this heat-insulation clearance 18 hardly varies from place to place and is substantially constant.

The heat-insulation clearance 18 is partially filled with a heat-insulation material 16, and the heat-insulation clearance 18 is vacuum-suctioned. Accordingly, the heat-insulation clearance 18 has: a vacuum area 17 that is not filled with the heat-insulation material 16; and an area that is filled with the heat-insulation material 16 and where the inner tank 12 is surface-supported by the heat-insulation material 16. The heat-insulation material 16 is a member that inhibits heat transfer from the outside to the inner tank 12 and holds the inner tank 12 to be separated from the outer tank 14. Here, in the present specification, "filling" means a state where the heat-insulation material 16 is arranged in the heat-insulation clearance 18 such that the heat-insulation material 16 is in contact with both of the inner tank 12 and the outer tank 14.

No particular limitation is imposed on a configuration of the heat-insulation material 16 so long as the heat-insulation material 16 exerts sufficient heat insulation performance. In this example, superinsulation 34 is used as the heat-insulation material 16. One or more heat shield layers 30 and one or more spacer layers 32 are stacked to form the superinsulation 34. The heat shield layer 30 is a layer that prevents thermal radiation, and is made of sheet-like metal (such as aluminum). The spacer layer 32 is a layer that prevents the heat transfer, and is made of a fiber material such as glass wool. Such superinsulation 34 has an average thermal conductivity of $1 \times 10^{-6}$ cal/sec.cm.° C. or lower.

Both the heat-insulation material 16 and the heat-insulation clearance 18 (and thus the vacuum area 17) are vacuum-suctioned. The vacuum suction effectively prevents the heat transfer to the inner tank 12. In this way, liquid hydrogen can be stored at low temperature. A seal-off valve 36 is provided to the outer tank 14. The seal-off valve 36 communicates with a suction pump (not illustrated) during this vacuum suction and is closed after the vacuum suction.

A rupture disc 38 is further attached to the outer tank 14. The rupture disc 38 is ruptured when an internal pressure of the outer tank 14 exceeds a specified allowable pressure, so as to communicate between the heat-insulation clearance 18 and an external space. The provision of such a rupture disc 38 can prevent an excess increase in the internal pressure of the outer tank 14 and thus can secure safety of the hydrogen tank 10 further reliably.

Figure 8:
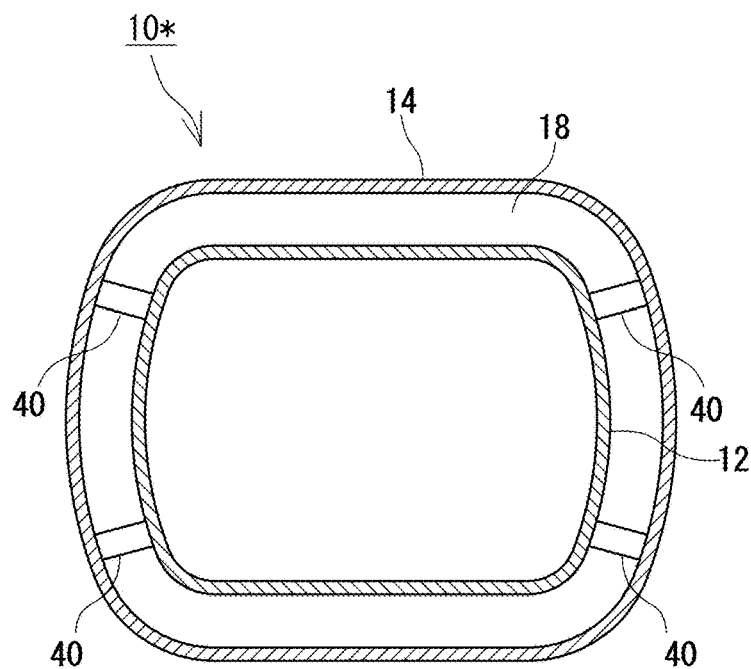
FIG. 8 is a schematic view illustrating an in-vehicle liquid hydrogen tank in a comparative example.
Figure 9:
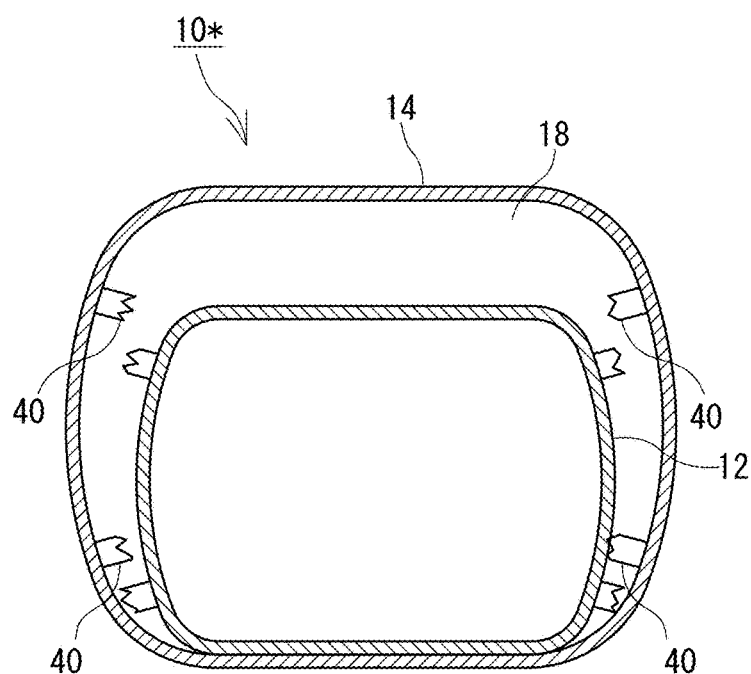
FIG. 9 is a schematic view illustrating a condition of the in-vehicle liquid hydrogen tank in the comparative example during a collision.

As it has been apparent from the description so far, in this example, the heat-insulation clearance 18, which is the clearance between the inner tank 12 and the outer tank 14, is partially filled with the heat-insulation material 16. A reason for such a configuration will be described in comparison with a comparative example. FIGS. 8 and 9 are schematic views illustrating a hydrogen tank 10* in the comparative example.

As illustrated in FIG. 8, in the hydrogen tank 10* in the comparative example, the inner tank 12 is suspended and held inside the outer tank 14 by a coupling member 40. The coupling member 40 is a member that connects the inner tank 12 and the outer tank 14, and is made of resin, for example. The heat-insulation clearance 18 between the inner tank 12 and the outer tank 14 is not provided with the heat-insulation material 16 but is vacuum-suctioned to have a high heat insulation property. Such a hydrogen tank 10* is mounted to a vehicle. In this case, when the vehicle collides with an obstacle, and a strong impact is applied to the hydrogen tank 10*, as illustrated in FIG. 9, the coupling member 40 is possibly damaged. In such a case, the inner tank 12 possibly collides with the outer tank 14 severely due to a gravitational force or an inertial force, which damages the inner tank 12. When the inner tank 12 is damaged, naturally, stored hydrogen leaks out and causes various problems.

Meanwhile, in this example, the heat-insulation material 16 is partially arranged around the inner tank 12, and a part of an outer surface of the inner tank 12 is in contact with the heat-insulation material 16. This heat-insulation material 16 is thicker than the heat-insulation clearance 18 in a no-load state (that is, a state where a pressure difference between the inside and the outside of the heat-insulation material 16 is almost zero). Thus, the heat-insulation material 16 is in tight contact with both the inner tank 12 and the outer tank 14 and holds the inner tank 12 to be separated from the outer tank 14.

Figure 3:
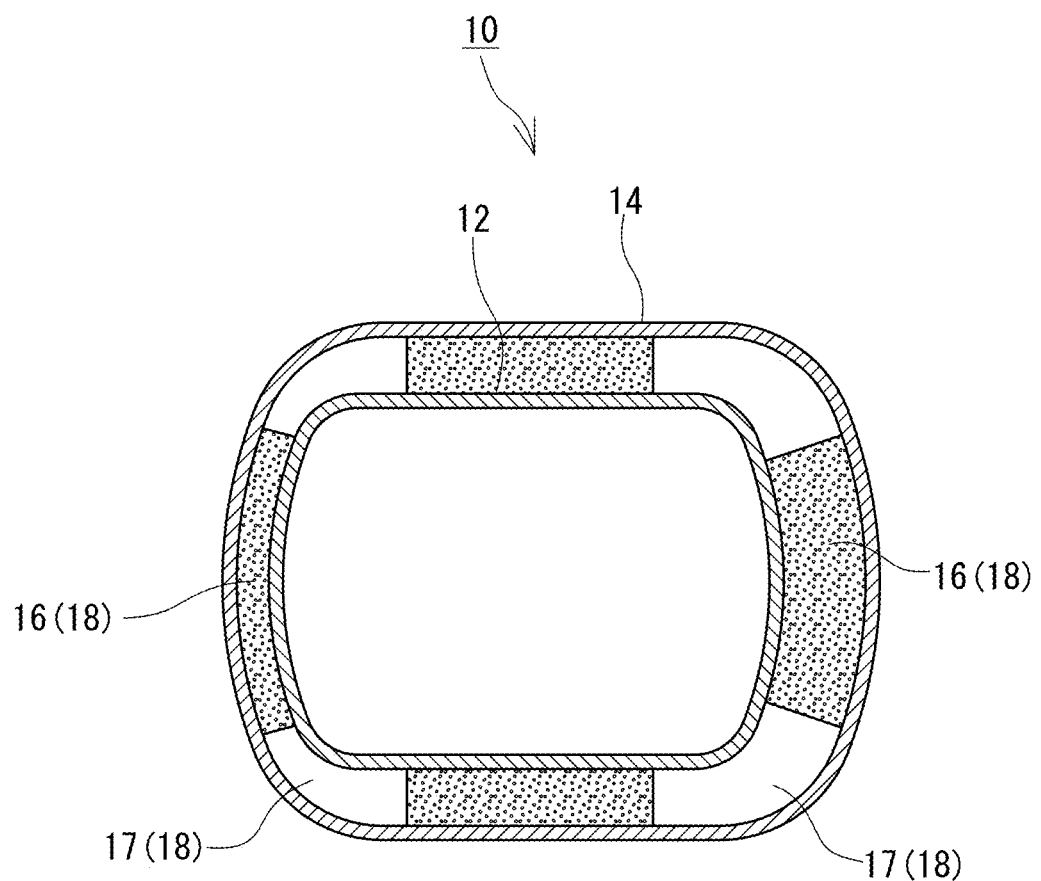
FIG. 3 is a schematic view illustrating a condition of the in-vehicle liquid hydrogen tank during a collision.

With such a configuration, even when the vehicle collides with the obstacle, the inner tank 12 remains separated from the outer tank 14. Thus, the impact on the inner tank 12 can be reduced. FIG. 3 is a schematic view illustrating a condition of the hydrogen tank during the collision. As illustrated in FIG. 3, according to this example, there is a case where the inner tank 12 moves slightly within the outer tank 14 due to the impact during the collision. However, since the heat-insulation material 16 is interposed between the outer tank 14 and the inner tank 12, the inner tank 12 remains separated from the outer tank 14. Thus, it is possible to effectively prevent the collision between the inner tank 12 and the outer tank 14. As a result, it is possible to further reliably prevent the damage to the inner tank 12 and thus leakage of hydrogen. In other words, according to this example, hydrogen can be stored further stably. In addition, in this example, the vacuum area 17 that is not filled with the heat-insulation material 16 is provided in the heat-insulation clearance 18. In the vacuum area 17, heat is transferred only by radiation. By partially providing such a vacuum area 17, it is possible to keep the heat-insulation property of the inner tank 12 high.

Figure 4:
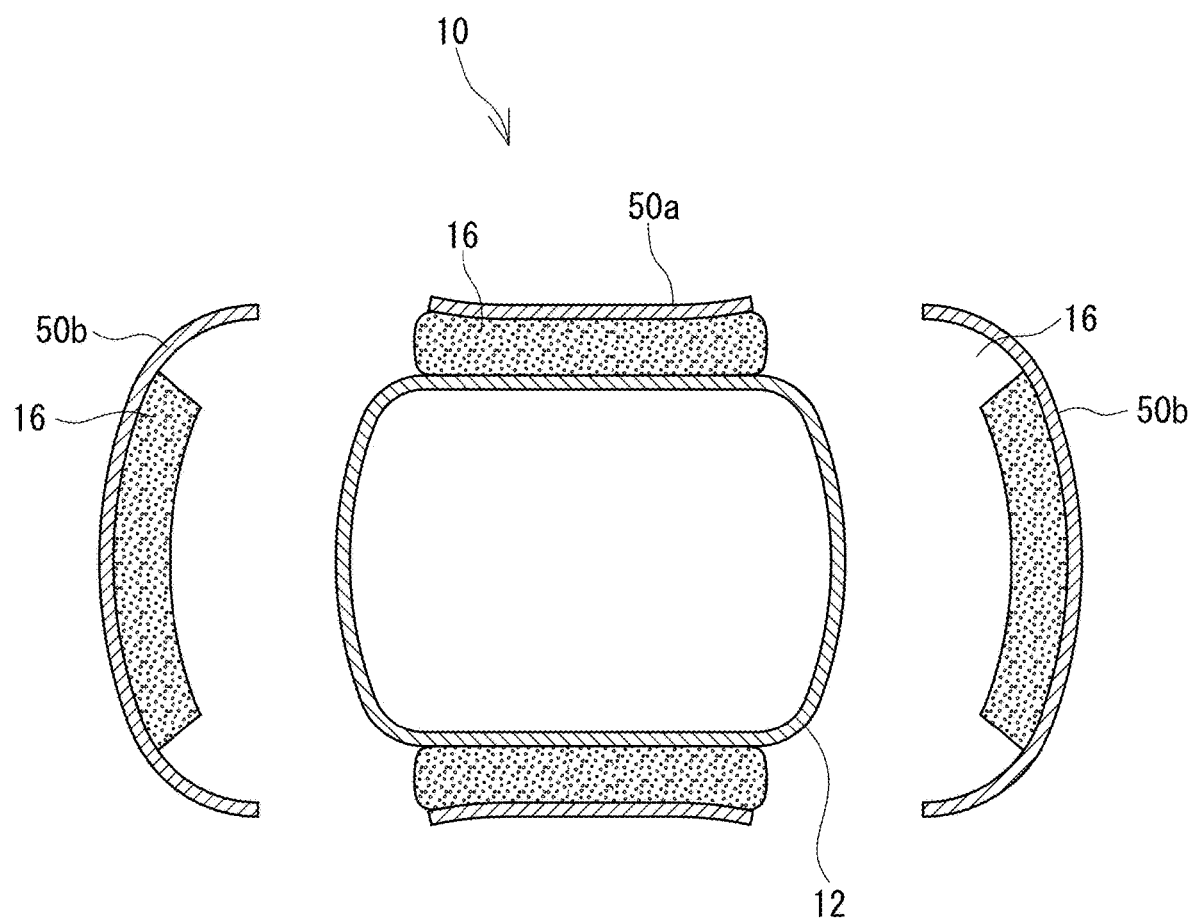
FIG. 4 is a schematic view illustrating the condition of the in-vehicle liquid hydrogen tank during manufacture.

Incidentally, as illustrated in FIG. 4, the outer tank 14 is formed by welding multiple outer tank pieces 50a, 50b. For example, the outer tank 14 is formed by welding a cylindrical trunk section piece 50a and end plate pieces 50b, each of which seals an end of the trunk section piece 50a. When the hydrogen tank 10 is manufactured, the outer tank pieces 50 are arranged around the inner tank 12, the heat-insulation material 16 is arranged between each of these outer tank pieces 50 and the inner tank 12, and the outer tank pieces 50 are welded. Then, when the outer tank 14 can be formed by welding, the heat-insulation clearance 18 is vacuum-suctioned.

Here, as described above, the heat-insulation material 16 is thicker than the heat-insulation clearance 18 in the no-load state. Accordingly, in the case where the heat-insulation material 16 is arranged between the inner tank 12 and the outer tank piece 50 in a manufacturing process of the hydrogen tank 10, as illustrated in FIG. 4, the inner tank 12 or the outer tank piece 50 is pressed and deformed by the heat-insulation material 16, which possibly results in an inappropriate shape of the inner tank 12 or the outer tank 14 in the end. In addition, in a deformed state of the outer tank piece 50, it is difficult to appropriately weld the outer tank pieces 50.

Figure 5A:
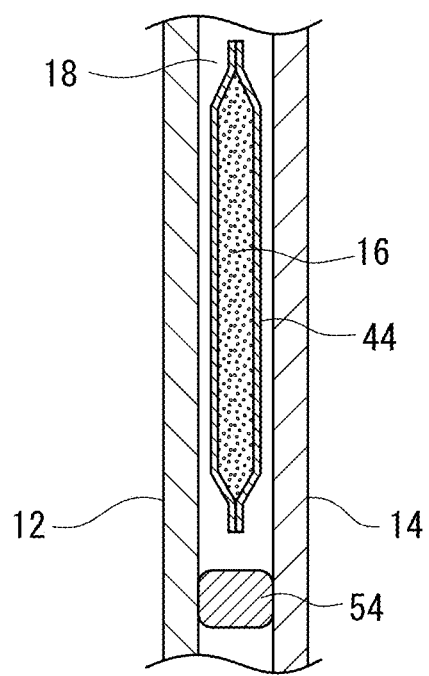
FIG. 5A is a schematic view illustrating a condition of a heat-insulation material before a heat-insulation clearance is vacuum-suctioned.
Figure 5B:
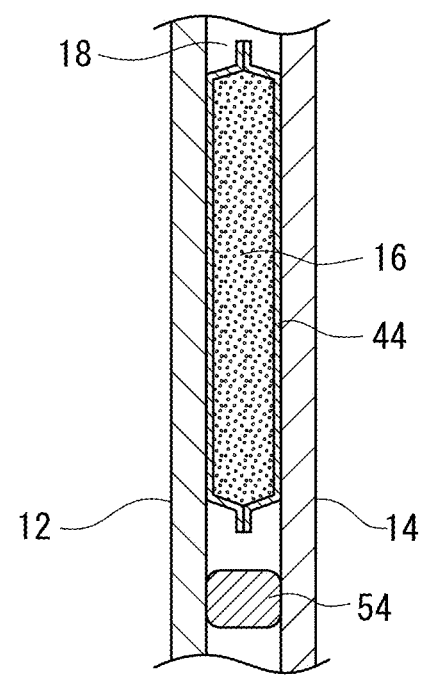
FIG. 5B is a schematic view illustrating the condition of the heat-insulation material after the heat-insulation clearance is vacuum-suctioned.

Thus, in this example, when the hydrogen tank 10 is manufactured, the heat-insulation material 16 is accommodated in a sealed bag 44 in advance, and this sealed bag 44 is vacuum-suctioned. A description thereon will be given with reference to FIG. 5A and FIG. 5B. FIG. 5A and FIG. 5B are schematic views, each of which illustrates a manufacturing condition of the hydrogen tank 10.

As illustrated in FIG. 5A, and as described above, the heat-insulation material 16 is accommodated in the sealed bag 44. This sealed bag 44 is vacuum-suctioned in advance. When the hydrogen tank 10 is manufactured, this sealed bag 44 is arranged in the heat-insulation clearance 18 between the inner tank 12 and the outer tank piece 50. At a stage before welding of the outer tank piece 50, the heat-insulation clearance 18 is not yet vacuum-suctioned. Thus, at this time point, the heat-insulation material 16 is pressed and compressed by the atmospheric pressure. As a result, at the stage before welding of the outer tank piece as illustrated in FIG. 5A, the heat-insulation material 16 is sufficiently thinner than the heat-insulation clearance 18. For this reason, even in the case where the heat-insulation material 16 is arranged in the heat-insulation clearance 18, neither the inner tank 12 nor the outer tank piece 50 is deformed by a pressing force from the heat-insulation material 16. At this time, the sealed bag 44 may be temporarily bonded to the inner tank 12 or the outer tank piece 50 so as to prevent movement of the sealed bag 44 within the heat-insulation clearance 18.

Once the heat-insulation material 16 is properly arranged, a worker welds the outer tank pieces 50 together to form the outer tank 14. Then, after the outer tank 14 is formed, the worker vacuum-suctions the heat-insulation clearance 18. As a result, a differential pressure between the inside and the outside of the sealed bag 44 is reduced, which eliminates compression of the heat-insulation material 16. Then, as illustrated in FIG. 5B, the heat-insulation material 16 expands sufficiently and is brought into tight contact with both the inner tank 12 and the outer tank 14. Once being in this state, the inner tank 12 is held to be separated from the outer tank 14 by the heat-insulation material 16.

However, in this case, it is difficult to maintain the thickness of the heat-insulation clearance 18 to be constant at the stage before welding of the outer tank piece 50. Thus, in this case, a spacer 54 (see FIGS. 5A and 5B) may partially be arranged between the inner tank 12 and the outer tank piece 50. No particular limitation is imposed on a configuration of the spacer 54 so long as the thickness of the heat-insulation clearance 18 can be maintained to be constant. Thus, the spacer 54 may be made of the resin or the metal. In addition, the spacer 54 may or may not be bonded to at least one of the inner tank 12 and the outer tank 14. Furthermore, in order to prevent transmission of a concentrated load to a part of the inner tank 12 via the spacer 54 during the collision of the vehicle, the spacer 54 may be configured to be deformed or destroyed relatively easily. For example, the spacer 54 may have a bent section or a vulnerable section to induce buckling.

Figure 6:
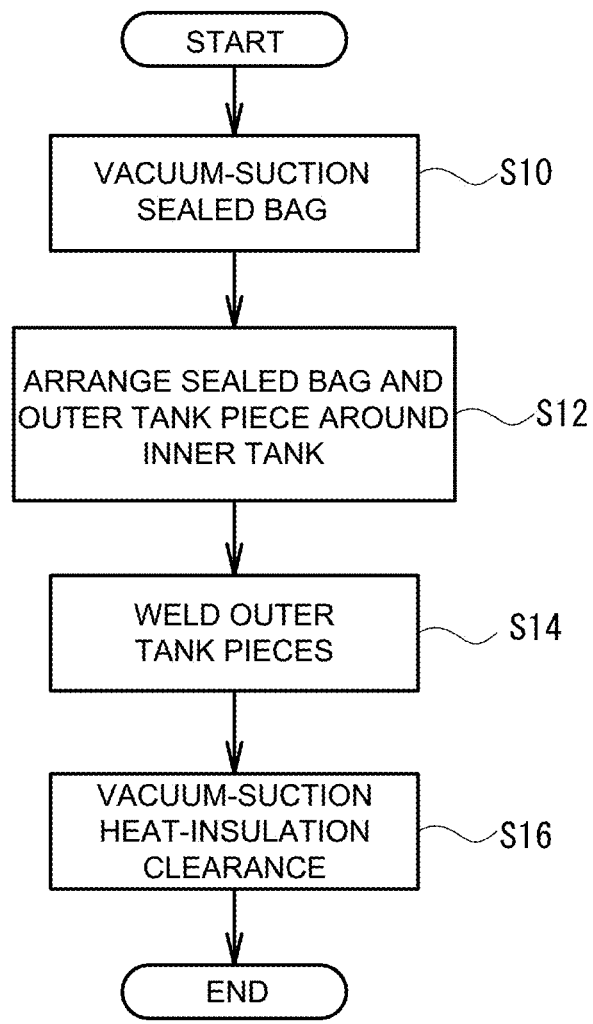
FIG. 6 is a flowchart illustrating a manufacturing flow of the in-vehicle liquid hydrogen tank.

FIG. 6 is a flowchart illustrating a manufacturing flow of the hydrogen tank 10. As illustrated in FIG. 6, and as described above, in the case where the hydrogen tank 10 is manufactured, the worker vacuum-suctions the sealed bag 44, which accommodates the heat-insulation material 16 (S10). Next, the worker arranges the outer tank pieces 50 and the sealed bags 44 around the inner tank 12 (S12). At this time, in order to keep the thickness of the heat-insulation clearance 18 as designed, the spacer 54 may be arranged between the inner tank 12 and the outer tank piece 50.

Next, the worker welds the outer tank pieces 50 together to form the sealed outer tank 14 (S14). Thereafter, the worker connects the seal-off valve 36 to the suction pump (not illustrated) and vacuum-suctions the heat-insulation clearance 18 (S16). As a result, the differential pressure between the inside and the outside of the sealed bag 44 is reduced, causing the heat-insulation material 16 to expand. Thus, the heat-insulation material 16 that has expanded is brought into contact with both of the inner tank 12 and the outer tank 14, and holds the inner tank 12 to be separated from the outer tank 14.

As it is apparent from the description so far, according to this example, the heat-insulation material 16 is provided to hold the inner tank 12 to be separated from the outer tank 14. With such a configuration, even in the case where the vehicle collides with the obstacle, and the strong impact is applied to the hydrogen tank 10, it is possible to effectively prevent the damage to the inner tank 12.

In addition, in this example, the internal pressure on the inner tank 12 can be dispersed and transmitted to the heat-insulation material 16 and the outer tank 14. Therefore, according to this example, it is possible to increase the maximum allowable pressure of the hydrogen tank 10 without thickening the inner tank 12 and the outer tank 14.

Figure 7:
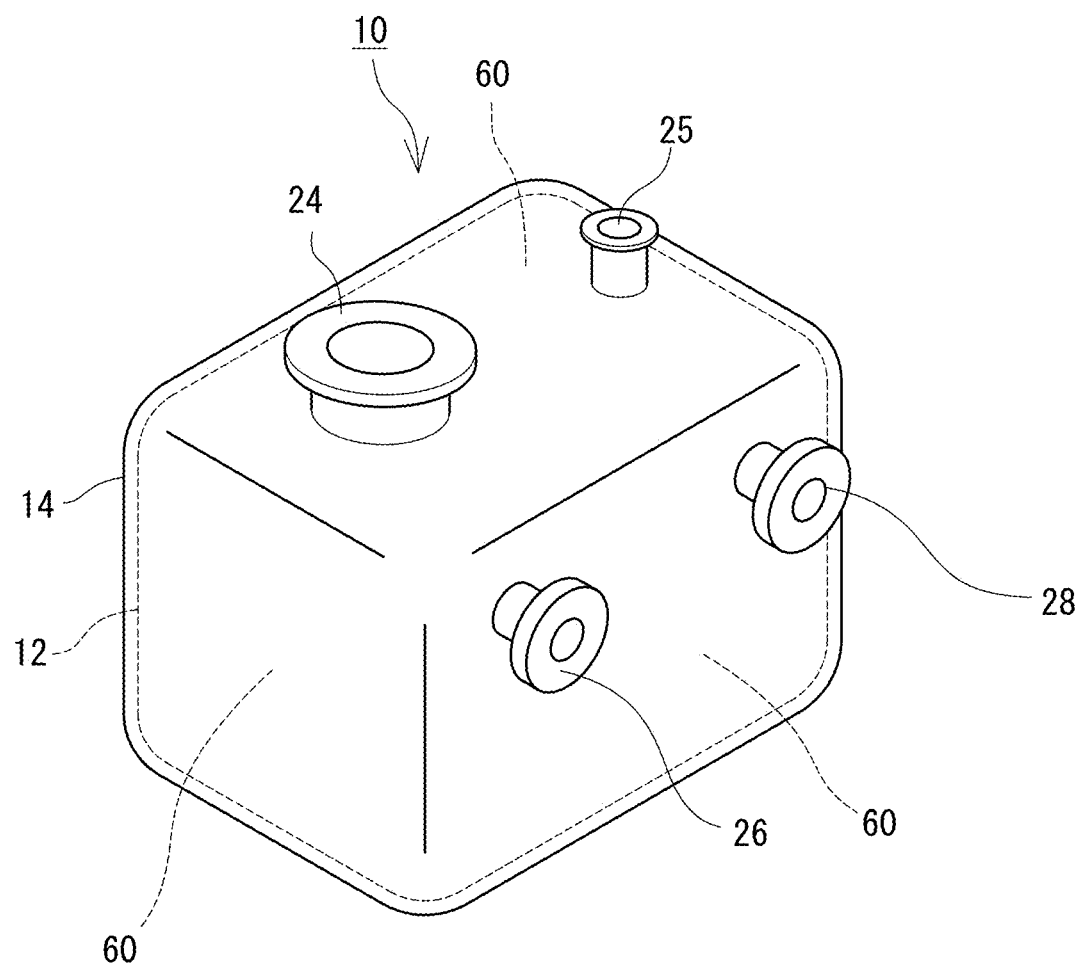
FIG. 7 is a schematic view illustrating another example of the in-vehicle liquid hydrogen tank.

Furthermore, it is possible to improve a degree of freedom in the shape of the inner tank 12 by providing the heat-insulation material 16. More specifically, the inner tank 12 can be shaped to have a flat surface section. For example, as illustrated in FIG. 7, the inner tank 12 may be formed in a substantially cuboid shape that has a plurality of flat surface sections 60. More specifically, in the case where the flat surface section 60 is provided to the inner tank 12 in a structure that the heat-insulation material 16 is not arranged in the heat-insulation clearance 18, the high pressure is applied to the flat surface section 60. In this case, there is a possibility that flat surface section 60 of the inner tank 12 is deformed and contacts the outer tank 14. Then, when the inner tank 12 is partially in contact with the outer tank 14, the heat insulation performance is rapidly degraded, and it becomes difficult to keep liquid hydrogen at low temperature. For this reason, the conventional inner tank 12 does not have the flat surface section 60 but is formed by the curved surface only. In other words, the conventional inner tanks 12 usually have the sandbag shape or a spherical shape.

Meanwhile, in the case where the heat-insulation material 16 is partially provided to the heat-insulation clearance 18 as in this example, the heat-insulation material 16 and the outer tank 14 receive the pressure on the flat surface section 60 even when the flat surface section 60 is provided to the inner tank 12. As a result, it is possible to effectively prevent the deformation of the inner tank 12. In addition, even when the inner tank 12 is deformed, it is possible to effectively prevent the contact of the inner tank 12 with the outer tank 14 and thus to maintain the high heat insulation performance. Therefore, according to this example, it is possible to improve the degree of freedom in the shape of the inner tank 12.

The configuration that has been described so far is merely one example, and the remainder of the configuration may be modified as long so the heat-insulation material 16 is at least partially filled between the inner tank 12 and the outer tank 14. For example, in the above-described description, the heat-insulation material 16 is accommodated in the sealed bag 44. However, the heat-insulation material 16 may directly be arranged in the heat-insulation clearance 18 without being accommodated in the sealed bag 44. In addition, the shape of the hydrogen tank 10 may be modified appropriately, and examples of the shape are the spherical shape, a rugby ball shape, and a rectangular parallelepiped shape. Furthermore, in this example, the booster pump 22 is provided to the hydrogen tank 10. However, it may be the case that the booster pump 22 is not provided.

The invention claimed is:

1. An in-vehicle liquid hydrogen tank, comprising:
an inner tank configured to store liquid hydrogen;
an outer tank that accommodates the inner tank;
a heat-insulation material that is disposed in a heat-insulation clearance as a clearance between the inner tank and the outer tank and holds the inner tank to be separated from an inner surface of the outer tank; and
a spacer that is partially arranged in the heat-insulation clearance, the spacer being configured to maintain a constant thickness of the heat-insulation clearance, wherein
the heat-insulation clearance has:
a vacuum area that is not filled with the heat-insulation material; and
an area that is filled with the heat-insulation material and thus allows the inner tank to be surface-supported by the heat-insulation material,
the heat-insulation material is accommodated in a sealed bag, and
both inside of the sealed bag and the heat-insulation clearance are vacuum-suctioned.

2. The in-vehicle liquid hydrogen tank according to claim 1, wherein
the heat-insulation material includes superinsulation defined by a stack of
one or more heat shield layers, each of which is made of a metal sheet, and
one or more spacer layers, each of which is made of a fiber material, and
the heat-insulation clearance is vacuum-suctioned in a state where the heat-insulation material is arranged therein.

3. The in-vehicle liquid hydrogen tank according to claim 1, wherein
the outer tank has a rupture disc that is configured to be ruptured in response to an internal pressure of the outer tank becoming equal to or higher than a specified allowable pressure, so as to expose the inside of the outer tank to atmospheric air.

4. The in-vehicle liquid hydrogen tank according to claim 1, wherein
the inner tank is shaped to have a flat surface section.

5. The in-vehicle liquid hydrogen tank according to claim 1, further comprising:
a booster pump configured to pressurize liquid hydrogen stored in the inner tank and output pressurized liquid hydrogen to outside the booster pump,
wherein a bottom portion of the inner tank is formed with a collector section which is depressed downward and in which a lower end of the booster pump is inserted.

6. A method for manufacturing an in-vehicle liquid hydrogen tank, the method comprising:
accommodating a heat-insulation material, which includes a fiber material, in a sealed bag and then vacuum-suctioning inside of the sealed bag; and
arranging, in an outer tank, an inner tank configured to store liquid hydrogen, arranging the sealed bag in a heat-insulation clearance as a clearance between the inner tank and the outer tank, and thereafter vacuum-suctioning the heat-insulation clearance, wherein the method further comprises:
prior to the arranging of the sealed bag in the heat-insulation clearance, partially arranging a spacer in the heat-insulation clearance, the spacer being configured to maintain a constant thickness of the heat-insulation clearance.

7. The in-vehicle liquid hydrogen tank according to claim 1, wherein the spacer has a bent section or a vulnerable section configured to induce buckling during a collision of a vehicle including the in-vehicle liquid hydrogen tank.

8. The in-vehicle liquid hydrogen tank according to claim 7, wherein the spacer is bonded to at least one of the inner tank or the outer tank.

9. The in-vehicle liquid hydrogen tank according to claim 8, wherein the spacer is made of resin or metal.

10. The in-vehicle liquid hydrogen tank according to claim 9, wherein
the heat-insulation material includes superinsulation defined by a stack of
one or more heat shield layers, each of which is made of a metal sheet, and
one or more spacer layers, each of which is made of a fiber material, and
the heat-insulation clearance is vacuum-suctioned in a state where the heat-insulation material is arranged therein.

11. The in-vehicle liquid hydrogen tank according to claim 10, wherein
the outer tank has a rupture disc that is configured to be ruptured in response to an internal pressure of the outer tank becoming equal to or higher than a specified allowable pressure, so as to expose the inside of the outer tank to atmospheric air.

12. The in-vehicle liquid hydrogen tank according to claim 11, wherein
the inner tank is shaped to have a flat surface section.

13. The in-vehicle liquid hydrogen tank according to claim 12, further comprising:
a booster pump configured to pressurize liquid hydrogen stored in the inner tank and output pressurized liquid hydrogen to outside the booster pump,
wherein a bottom portion of the inner tank is formed with a collector section which is depressed downward and in which a lower end of the booster pump is inserted.

14. The in-vehicle liquid hydrogen tank according to claim 13, wherein in the vacuum area, heat is transferred only by radiation.

* * * * *